P. G. TEN EYCK.

INSULATED RAIL JOINT.

APPLICATION FILED JUNE 30, 1914.

Reissued Sept. 18, 1917.

14,362.

2 SHEETS—SHEET 1.

Witnesses

Harry B. Rook.

Emory L. Groff

Inventor

PETER G. TEN EYCK

By

D. T. Wilhamson

Attorney

P. G. TEN EYCK.

INSULATED RAIL JOINT.

APPLICATION FILED JUNE 30, 1914.

Reissued Sept. 18, 1917.

14,362.

2 SHEETS—SHEET 2.

Witnesses

Harry B. Rook

Emory L. Groff

Inventor.

PETER G. TEN EYCK

By

D. T. Wolhaupter

Attorney

UNITED STATES PATENT OFFICE.

PETER G. TEN EYCK, OF ALBANY, NEW YORK, ASSIGNOR TO THE RAIL JOINT COMPANY, A CORPORATION OF NEW YORK.

INSULATED RAIL-JOINT.

14,362. Specification of Reissued Letters Patent. Reissued Sept. 18, 1917.

Original No. 997,475, dated July 11, 1911, Serial No. 489,275, filed April 12, 1909. Application for reissue filed June 30, 1914. Serial No. 848,304.

*To all whom it may concern:*

Be it known that I, PETER G. TEN EYCK, a citizen of the United States, residing at Albany, in the county of Albany and State of New York, have invented certain new and useful Improvements in Insulated Rail-Joints, of which the following is a specification.

My invention relates to insulated rail joints, and one of the objects of my invention is to provide a means for insulating rail joints in such a manner that water seepage may be prevented, the life of the insulation and connections lengthened, the efficiency of the insulation increased and economy in time and money obtained, together with such other elements and combinations as are hereinafter more particularly set forth. I attain these objects by means of the mechanism illustrated in the accompanying drawings, in which.

Similar letters refer to similar parts throughout the several views.

I have shown various forms of my invention as applied to rail joints, more particularly for the purpose of illustrating that there are many ways in which my invention may be employed than of intending to give all of the ways which would suggest themselves to a practical railroad man.

A great deal of trouble has been experienced with the use of insulation in connection with rails, as the constant jar, intermittent motion and severe and sharp blows to which the insulating substance is subjected tends to break, loosen and otherwise cause disintegration of the parts; also by allowing water to collect and ultimately destroying the insulation, requiring extensive repairs. To prevent these objectionable occurrences it is necessary to have the insulation held rigidly in position and to prevent the moving parts of the rail, by moving parts I mean those which are caused to vibrate under the action of trains, from wearing the insulation. Many devices have been tried to prevent the creeping movement of the insulation in rail joints, none so far as I am aware having resulted in preventing the wear of the insulation at the same time that the insulation is held securely in positoin. Another objection to be removed is that of installing the insulation on the road bed, where because of the frequent passage of trains, and lack of accommodation for the exercise of skilful work it is difficult to place the insulation in the best possible manner. This I do by arranging my insulation in contact with a plate ready for being placed in its position without manipulation of the insulating material at the place of work on the road. To accomplish this I place the insulation A, in contact with a plate B securely fastening the insulation to the plate by adhesive substance or in any suitable manner. The permanent attachment of the insulation A to the metal plate may be accomplished by means of any suitable expedients, such for instance as by a cement, for example silicate of soda or equivalent substances; or partial or complete vulcanization might be utilized for the same purpose. Therefore, the insulation A attached thereto may be of any desired form, corresponding of course to the place in which it is to be used.

Figure 1:
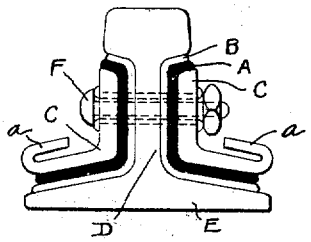
Figure 1 is an end elevation of a rail provided with my invention.

In Fig. 1, I have shown my preferred form of rail joint and fish plate. The plate B to which is attached the insulation is placed between the fish plates and the web D, the plate B being in contact with the web and base E of the rail, insulation A, being in contact with the fish plates C. Insulation is also preferably placed around the bolt F separating all the metallic parts of the bolt from the rail and fish plates in the usual manner. The fish plates C are each bent to form an overlapping portion *a* near their lower edges, extending above that portion of the fish plate which corresponds in position to the base of the rail. This overlapping portion *a* tends to strengthen the fish plate and prevents the extension of the base of the rail, rendering my rail joint capable of being placed where many rails, frogs and webs require the greatest economy in space. The rail joint is equally strong as constructed in the manner illustrated in Fig. 1, as it would be if the overlapping piece *a* were caused to extend on a prolongation of the main portion of the fish plate as is usually done.

Figure 4:
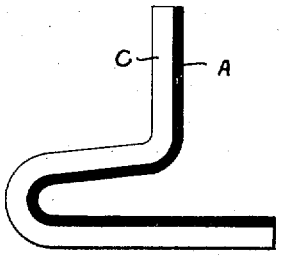
Fig. 4 is a detail view of an angle iron.

In Fig. 4 I have shown my arrangement of the angle iron C, and insulation A, ready to be attached to a rail joint of a form different from that shown in Fig. 1, but which is a common form in use.

In Figs. 5, 6, 7 and 8 I show modified forms of my invention.

Figure 5:
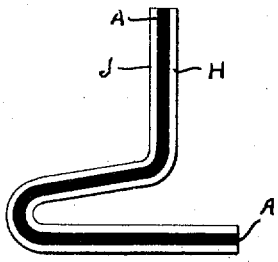
Fig. 5 is a view of the insulation and retaining plates before they are in position for use.

In Fig. 5 I use two plates H and J, placing insulation A between them.

Figure 6:
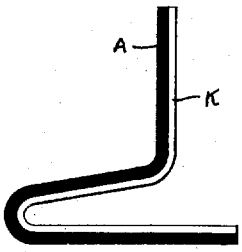
Fig. 6 is a modified form of the arrangement of my insulation and retaining plate.
Figure 8:
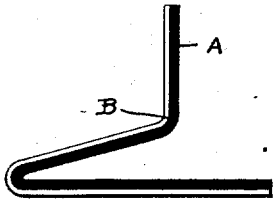
Fig. 8 is a still further modified form of my insulation and retaining plate.

In Fig. 6 I show the plate K with insulation A attached, but the insulation placed on the opposite side of the plate K from that shown in Fig. 8.

Figure 7:
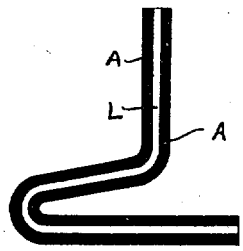
Fig. 7 is another modified form of my insulation and retaining plate.

In Fig. 7 I show insulation A, A, on both sides of plate L, placing the plate between the insulation.

Figure 9:
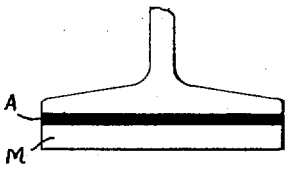
Fig. 9 is a bottom plate provided with my invention.
Figure 10:
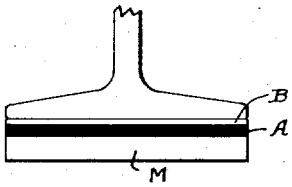
Fig. 10 is a bottom plate provided with a modified form of my invention.
Figure 11:
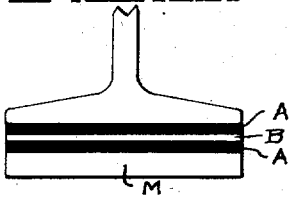
Fig. 11 is a bottom plate provided with a still further modified form of my invention.

In Fig. 8, I show the insulation A, and plate B, placed in different form from that shown in Figs. 5, 6 and 7, in the form shown in each of these figures the spirit of my invention being maintained, which is that of securing insulation rigidly in place and thus preventing any movement of the insulation when placed in the rail joint, and arrangeing for having the parts ready to be put in position without doing the work of placing the insulation on the road. In Figs. 9, 10 and 11, I show this same arrangement illustrated in Figs. 5, 6 and 7, of placing insulation on one side or the other, or on both sides of a plate. Thus, in Fig. 9 the insulation A is put on the base plate M.

In Fig. 10, the insulation is placed on a plate B, and the plate B is in contact with the foot of the rail.

In Fig. 11, the insulation A is in contact with the foot of the rail, plate B comes next, and then insulation A is brought in contact with the base plate M.

Figure 2:
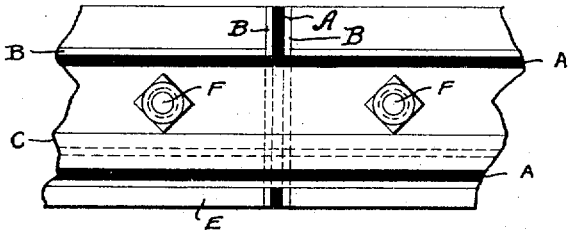
Fig. 2 is a side elevation.
Figure 3:
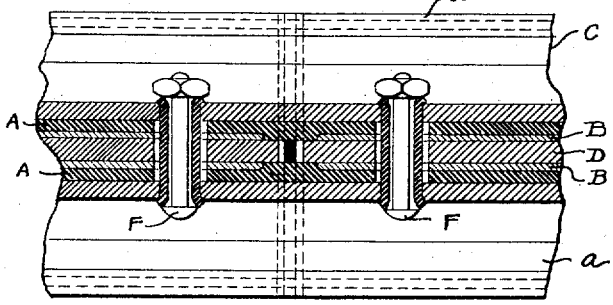
Fig. 3 is a plan.
Figure 12:
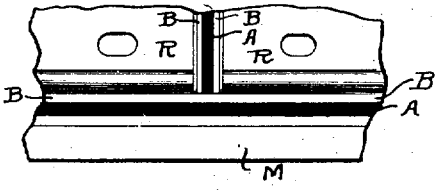
Fig. 12 is an elevation, partly broken away, showing the manner of placing insulation between the ends of the rails.
Figure 13:
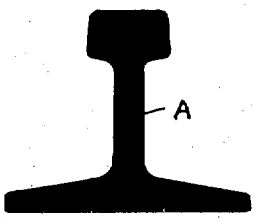
Fig. 13 is a modified form of my invention applied to the ends of the rails.
Figure 14:
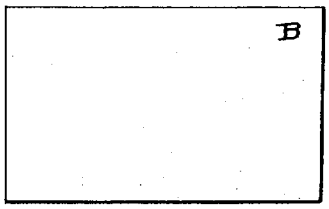
Fig. 14 is a plan of a sheet of insulation.

In Fig. 12, and also in Fig. 2, I show the invention embodied in an end post unit adapted to be interposed between the rail ends R within the joint. This end post unit consists of the separate metal plates B and a sheet of insulating material A confined between said plates and permanently secured thereto and carried thereby. This provides a very practical and important feature of the invention inasmuch as the ordinary non-protected fiber end posts are subject to severe abrasion by the vertical motion of the ends of the rails, and this is entirely obviated by an end post unit of the construction described. However, under certain conditions, the expedient shown in Fig. 13 may be resorted to namely that of having insulation A attached directly to the end of the rail.

Figures 15, 16, 17:
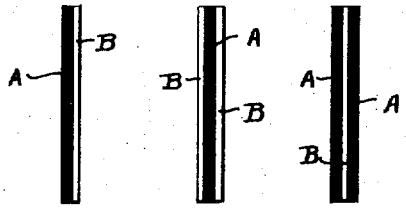
Fig. 15 is an end elevation of one form of constructing the sheet of insulation shown in Fig. 14.
Fig. 16 is a modified form or mode of constructing a sheet of insulation.
Fig. 17 is a still further modified form of constructing a sheet of insulation.
Figure 18:
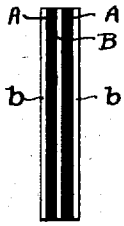
Fig. 18 is a still further modified form of constructing a sheet of insulation.

In Figs. 14, 15, 16, 17 and 18, I show a sheet composed of a plate B and insulation A, in which the insulation may be placed as shown in Fig. 15 in contact with the plate B, or in 16, two plates B, with insulation A between them, or as in Fig. 17 with insulation on each side of the plate B, in Fig. 18 with insulation on each side of plate B, with plates *b*, on each side thereof, making plate, insulation, plate, insulation and plate.

Figure 19:
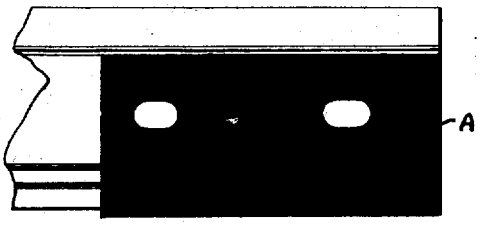
Fig. 19 is a side elevation of a rail provided with a sheet of insulation.

In Fig. 19 I show insulation in direct contact with the rail.

Figure 20:
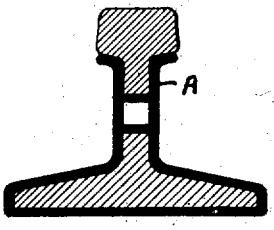
Fig. 20 is a section of the end of a rail provided with my invention.

In Fig. 20 I show insulation attached directly to the rail.

Figure 21:
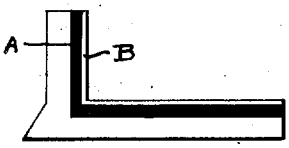
Fig. 21 is an elevation of an angle plate provided with my invention.
Figure 22:
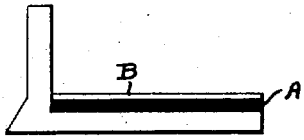
Fig. 22 is a modified form of angle plate provided with my invention.
Figure 23:
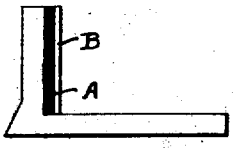
Fig. 23 is a still further modified form of angle plate provided with my invention.

In Figs. 21, 22 and 23 I show my invention in contact with a well known form of angle iron, in which plate B and insulation A are arranged substantially in the manner hereinbefore described. The plate B, I have termed a holding plate, which is a distinctive name showing that the insulation is held thereby.

I may use the term angle iron and fish plate indiscriminately, each being used in the trade. Where I refer to insulation I intend to be understood as meaning all kinds of materials used for insulation, including that known in the art as enamel insulation, and where I have referred to fastening or securing the insulation to the other parts I intend to be understood as referring to the placing of enamel insulation onto the parts as well as other insulating substances.

In my preferred rail joint, illustrated in

Fig. 1, I may secure together the fish plate C, insulation A, and holding plate B, so that in one piece I may ship and install the fish plate, insulation and holding plate. I do not desire to be understood, however, as now limiting myself to the exact order in which these may be placed, but that they all may be secured together, so that they will form one body, if desired.

What I claim as my invention and desire to secure by Letters Patent is:

1. In a rail joint comprising the rails, a fish plate, a holding plate, insulation placed between and permanently attached throughout its entire length to both the fish plate and the holding plate.

2. A rail joint, comprising a rail, a fish plate provided with a lower flange bent over on itself and resting above the main portion of said fish plate on the same side of the web of the rail as said fish plate, an insulation placed between said fish plate and said rail, substantially as described.

3. A rail joint comprising the rails, a holding plate in contact with the web on the underside of the head and with the foot of the rail throughout the extent of the holding plate, a fish plate, insulation placed between the fish plate and holding plate and permanently attached to each throughout the extent thereof.

4. A rail joint comprising the rails, a fish plate, a holding plate, an insulation placed between the fish plate and the holding plate and permanently attached to each whereby gases, water, oil, acids, cinders, dirt and all foreign substances are prevented from coming in contact with the insulation, and no moving part is permitted to touch the insulation in any way.

5. An insulated rail joint including, in combination, the rails, a splice bar, and a separate insulating filler unit interposed between the splice bar and the rail and including a metal plate and a sheathing of insulation material having a sealed union with the plate to thereby form a fixed and permanent part of the unit.

6. An insulated rail joint including, in combination, the rail, a splice bar, and a separate insulating filler unit adapted to be interposed between the rail and the joint bar, and including a metal plate lying next to the rail and a sheathing of insulation material having a sealed union with the plate to thereby form a fixed and permanent part of the unit.

7. An insulated rail joint including, in combination with opposing metal faces within the joint, an insulating unit interposed between said metal faces and consisting of separate metal plates and a sheet of insulating material confined between said plates and permanently secured thereto and carried thereby.

8. An insulated rail joint, including in combination with opposing rail ends within the joint, an insulating unit interposed between said rail ends and consisting of separate metal plates, and a sheet of insulating material confined between said plates, and carried thereby.

9. An insulated rail joint, including in combination with opposing rail ends within the joint, an insulating unit interposed between said rail ends and consisting of separate metal plates, and a sheet of insulating material confined between said plates and permanently secured thereto and carried thereby.

In testimony whereof I hereunto affix my signature in the presence of two witnesses.

PETER G. TEN EYCK.

Witnesses:

L. M. Batchelder,

Emory L. Groff.

Copies of this patent may be obtained for five cents each, by addressing the "Commissioner of Patents, Washington, D. C."